(12) United States Patent
Builta

(10) Patent No.: US 7,617,024 B2
(45) Date of Patent: Nov. 10, 2009

(54) AUTOMATIC HEADING CONTROL SYSTEM FOR TILTROTOR AIRCRAFT AND HELICOPTERS

(75) Inventor: Kenneth E. Builta, Euless, TX (US)

(73) Assignee: Bell Helicopter Textron Inc., Hurst, TX (US)

( * ) Notice: Subject to any disclaimer, the term of this patent is extended or adjusted under 35 U.S.C. 154(b) by 308 days.

(21) Appl. No.: 11/524,888

(22) Filed: Sep. 22, 2006

(65) Prior Publication Data
US 2008/0075591 A1  Mar. 27, 2008

(51) Int. Cl.
*B64C 15/00* (2006.01)
(52) U.S. Cl. .......................... 701/10; 244/11
(58) Field of Classification Search ............ 701/2, 701/7, 10, 200, 206, 201, 210; 73/178 R; 244/17.11, 17.13, 17.19, 195, 197; 702/144
See application file for complete search history.

(56) References Cited

U.S. PATENT DOCUMENTS

| | | | |
|---|---|---|---|
| 3,103,329 A * | 9/1963 | Unger et al. ................. | 244/189 |
| 4,999,782 A * | 3/1991 | BeVan ........................ | 701/206 |
| 5,178,307 A * | 1/1993 | Wright et al. ............. | 244/17.13 |
| 5,224,664 A | 7/1993 | Adams, Sr. | |
| 5,738,300 A | 4/1998 | Durand | |
| 6,059,226 A | 5/2000 | Cotton | |
| 6,256,975 B1 * | 7/2001 | Dobbeling et al. ............ | 60/776 |
| 2003/0066926 A1 | 4/2003 | Salesse-Lavergne | |

OTHER PUBLICATIONS

International Search Report issued in PCT/US2007/078703, May 8, 2008, 4 pages.
Written Opinion of the International Searching Authority issued in PCT/US2007/078703, May 8, 2008, 6 pages.

* cited by examiner

*Primary Examiner*—Dalena Tran
(74) *Attorney, Agent, or Firm*—Pillsbury Winthrop Shaw Pittman LLP

(57) ABSTRACT

One embodiment of the present invention is a method for automatically reducing the effect of a component of an external force that is laterally incident on a rotorcraft. A signal of the rotorcraft indicative of and proportional to the component is monitored. An absolute value of the signal and a preset high limit are compared. If the absolute value is greater than the preset high limit, manual heading control of the rotorcraft is disabled and the heading of the rotorcraft is adjusted with respect to the external force so as to decrease the lateral component of the external force experienced by the rotorcraft.

21 Claims, 3 Drawing Sheets

AUTOMATIC HEADING CONTROL SYSTEM FOR TILTROTOR AIRCRAFT AND HELICOPTERS

BACKGROUND OF THE INVENTION

1. Field of the Invention

Embodiments of the present invention relate to systems and methods for automatically controlling the heading of a tiltrotor aircraft or helicopter experiencing an excessive lateral force. More particularly, embodiments of the present invention relate to systems and methods for automatically commanding a heading change of a tiltrotor aircraft or helicopter when a lateral swashplate position signal or a lateral acceleration signal exceeds a preset limit.

2. Background Information

Rotorcraft can include, but are not limited to, tiltrotor aircraft, helicopters, or autogyros. Rotorcraft can be manned or unmanned aircraft. Manned rotorcraft can be commanded by a pilot. Unmanned rotorcraft can be commanded by a ground control station (GCS) operator or flight control box (FCB) operator. Rotorcraft can, for example, take off and land vertically, move horizontally, or hover in place. Rotorcraft can also generally move or maintain their position in response to external forces by pitching one or more main rotors.

The control systems for rotorcraft are complex electrical and/or mechanical systems. The control systems respond to the pilot or operator's input, but also must accommodate forces acting upon rotor assemblies that are generally outside the control of the pilot or operator. Mechanical control systems typically include a swashplate arrangement that includes a stationary portion and a rotating portion. Typically, the lower, stationary portion is fixed in position and will not rotate, but has the ability to move up and down and/or tilt in any given direction. This is commonly referred to as the "stationary" or "non-rotating" swashplate. Pilot or operator inputs alter the vertical position of the stationary swashplate through the collective control and the tilt or pitch of the stationary swashplate through the cyclic control. The rotating portion of the swashplate arrangement is free to rotate. Of course, pilot or operator inputs to the non-rotating portion are passed through to the rotating portion of the control systems.

Excessive external lateral force can adversely affect the control system of a rotorcraft. Such an excessive external lateral force can include, but is not limited to, a large cross wind (normal to the aircraft heading) experienced by a rotorcraft during hover or landing. Generally, a pilot or operator will command the control system of the rotorcraft to handle the lateral force or cross wind once it is detected. The control system will then tilt the swashplate to oppose the lateral force.

For a tiltrotor aircraft, there are two methods of controlling the lateral velocity and position of the aircraft while hovering with a cross wind. The first method requires tilting the aircraft downward in the lateral axis toward the cross wind. This method requires no lateral cyclic swashplate input, but rather relies upon controlling the differential collective rotor control to hold the lateral aircraft attitude at the required position to yield the desired lateral force to oppose the cross wind. The second method allows the aircraft to hover with a lateral attitude of zero by using the lateral swashplate control to produce the lateral force to oppose the cross wind, while the differential collective control is used to maintain the aircraft level attitude. The second method provides dynamic and operational advantages, but this type of opposition to the lateral force can present at least two additional problems. First, the lateral force can be so large that it exceeds the physical limitations of the control system and swashplate. Second, so much of the control system or tilt in the swashplate is used to oppose the lateral force that there is not enough control left in the control system to fly or land the rotorcraft.

In view of the foregoing, it can be appreciated that a need exists for systems and methods that can monitor the lateral forces on a rotorcraft and automatically change the heading of the rotorcraft if it experiences an excessive lateral force.

BRIEF SUMMARY OF THE INVENTION

One embodiment of the present invention is a method for automatically reducing the effect of a component of an external force that is laterally incident on a rotorcraft. A signal of the rotorcraft indicative of and proportional to the component is monitored. An absolute value of the signal and a preset high limit are compared. If the absolute value is greater than or equal to the preset high limit, manual heading control of the rotorcraft is disabled and the heading of the rotorcraft is adjusted with respect to the external force so as to decrease the lateral component of the external force experienced by the rotorcraft.

Another embodiment of the present invention is a method for automatically controlling the heading of a rotorcraft. A lateral control signal of the rotorcraft is monitored. An absolute value of the lateral control signal is compared to a preset high limit. If the absolute value of the control signal is greater than or equal to the preset high limit, a lateral heading command that will decrease the absolute value of the lateral control signal is calculated from the lateral control signal, a heading error is calculated from a difference between the lateral heading command and a current heading of the rotorcraft, a manual heading command is disabled, and the heading error is provided to a flight control system of the rotorcraft to control the heading of the rotorcraft.

Another embodiment of the present invention is a system for automatically controlling the heading of a rotorcraft. The system includes a data capture module, a comparison module, and a heading control module. The data capture module monitors a lateral control signal of the rotorcraft. The comparison module accepts the lateral control signal as input from the data capture module and compares an absolute value of the lateral control signal to a preset high limit. The heading control module accepts the lateral control signal as input from the data capture module and a result of the comparison of the absolute value of the lateral control signal to a preset high limit as input from the comparison module. The heading control module calculates a lateral heading command from the lateral control signal that will decrease the absolute value, calculates a heading error from a difference between the lateral heading command and a current heading of the rotorcraft, disables a manual heading command, and provides the heading error to a flight control system of the rotorcraft to control the heading of the rotorcraft, if the result from the comparison module identifies the absolute value as greater than or equal to the preset high limit.

Figure 1:
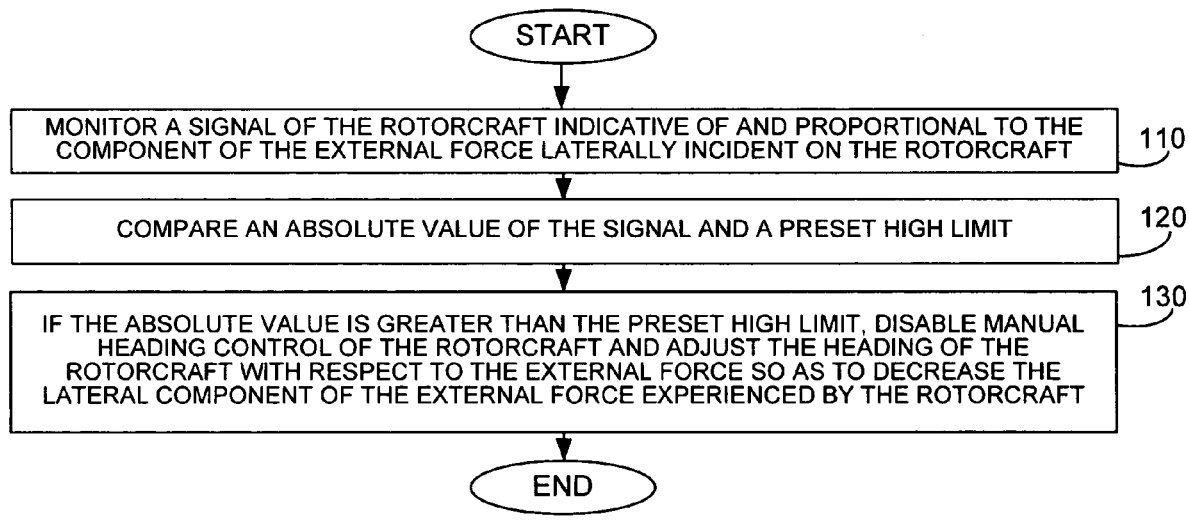
FIG. 1 is a flowchart showing a method for automatically reducing the effect of a component of an external force that is laterally incident on a rotorcraft, in accordance with an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Generally, a pilot or operator commands the heading of a rotorcraft for flight conditions at or near hover conditions. If there is not enough control authority for the desired flight condition, then it is the responsibility of the pilot or operator to determine when the limits of the control authority are being approached and to avoid commands that will exceed the limits. If a command exceeds the limits of the control authority, the rotorcraft will not be able to follow the command.

In one embodiment of the present invention, the heading of a rotorcraft is controlled automatically in flight conditions where it might not be possible for the rotorcraft to follow specific heading commands. Such flight conditions can include, for example, hovering in high wind where the range of heading control is severely limited.

When a lateral force is generated by using lateral cyclic blade pitch to resist a cross wind, there is a limit to the control authority available. Lateral cyclic blade pitch is produced, for example, by lateral swashplate tilt. As more lateral cyclic blade pitch is required to oppose the lateral wind force, there is less longitudinal cyclic blade pitch available. If the control limits are not closely observed, a loss of control can result. Automatically controlling the heading of a rotorcraft can prevent the loss of control that can occur if the control authority needed for the flight condition is greater than the amount that is available.

In the case of a tiltrotor, there is an additional pitch moment generated by a cross wind or side slip, which requires more longitudinal swashplate authority to correct for this condition. The increased longitudinal cyclic blade pitch required can cause conditions where there is not enough control authority to fly the aircraft.

In another embodiment of the present invention, a system detects when the lateral swashplate position exceeds a preset level and a yaw command is generated to turn the aircraft into the wind and reduce the amount of total swashplate command required. This automatic heading correction is triggered when the filtered lateral swashplate position exceeds the preset level or safe condition and is turned off when the filtered lateral swashplate position falls within a safe range.

In another embodiment of the present invention, lateral acceleration is used as the signal to command the automatic heading control. If lateral cyclic blade pitch is used for lateral control, then the rotorcraft can attain lateral velocities or hover in a cross wind while maintaining a level roll attitude. Some rotorcraft do not use lateral swashplate commands to generate lateral forces, however. When lateral cyclic blade pitch is not used for lateral control, the automatic heading system uses lateral acceleration as the signal to command the automatic heading control.

In this embodiment, there is a steady lateral acceleration caused by the roll attitude of the rotorcraft. This lateral acceleration is an indication of the side force or lateral force required to maintain the flight condition. A system detects when the lateral acceleration exceeds a preset level and a yaw command is generated to turn the aircraft into the wind and reduce the amount of roll of the rotorcraft. This automatic heading correction is triggered when the lateral acceleration exceeds the preset level or safe condition and is turned off when the lateral acceleration falls within a safe range.

The heading of a manned rotorcraft is typically commanded by a pilot. The heading of an unmanned rotorcraft can be commanded by a GCS operator or FCB operator. Automatically controlling the heading of a rotorcraft in response to lateral external forces is particularly important for unmanned rotorcraft, where these is no pilot onboard to detect an unsafe condition.

In another embodiment of the present invention, both the lateral swashplate position and the lateral acceleration signal are available to command the automatic heading control. An automatic heading control system uses the lateral swashplate position or the lateral acceleration signal to limit the lateral forces to safe levels by automatically commanding a heading change to reduce the force required to oppose the lateral forces. The automatic heading control system operates the same whether a lateral swashplate command or a roll attitude command is used as the lateral control device. Safe operating levels are determined and preset values are established for triggering the automatic heading control system to engage and disengage. When the preset high limit is exceeded, the rotorcraft heading is commanded to change in the direction to reduce the amount of lateral swashplate tilt or lateral acceleration. The heading stops changing when the signal is reduced below a preset low limit.

The preset values are set based upon the control authorities available and the level of lateral and longitudinal commands that are required for safe flight. The preset values of swashplate tilt are, for example, based upon a short term average of the commands. A short term average of commands is obtained using a two second time constant low-pass filter, for example. The filtering of signals prevents automatic heading commands from being triggered for very short commands, when average signals are not excessive.

FIG. 1 is a flowchart showing a method 100 for automatically reducing the effect of a component of an external force that is laterally incident on a rotorcraft, in accordance with an embodiment of the present invention. The external force can be, but is not limited to, a cross wind.

In step 110 of method 100, a signal of the rotorcraft indicative of and proportional to the component is monitored. The signal can be, but is not limited to, a lateral swashplate position signal or a lateral acceleration signal.

In step 120, an absolute value of the signal and a preset high limit are compared.

In step 130, if the absolute value is greater than the preset high limit, manual heading control of the rotorcraft is disabled and the heading of the rotorcraft is adjusted with respect to the external force so as to decrease the lateral component of the external force experienced by the rotorcraft.

In another embodiment of method 100, if the absolute value of the signal is less than a preset low limit, manual control of the rotorcraft is enabled.

Figure 2:
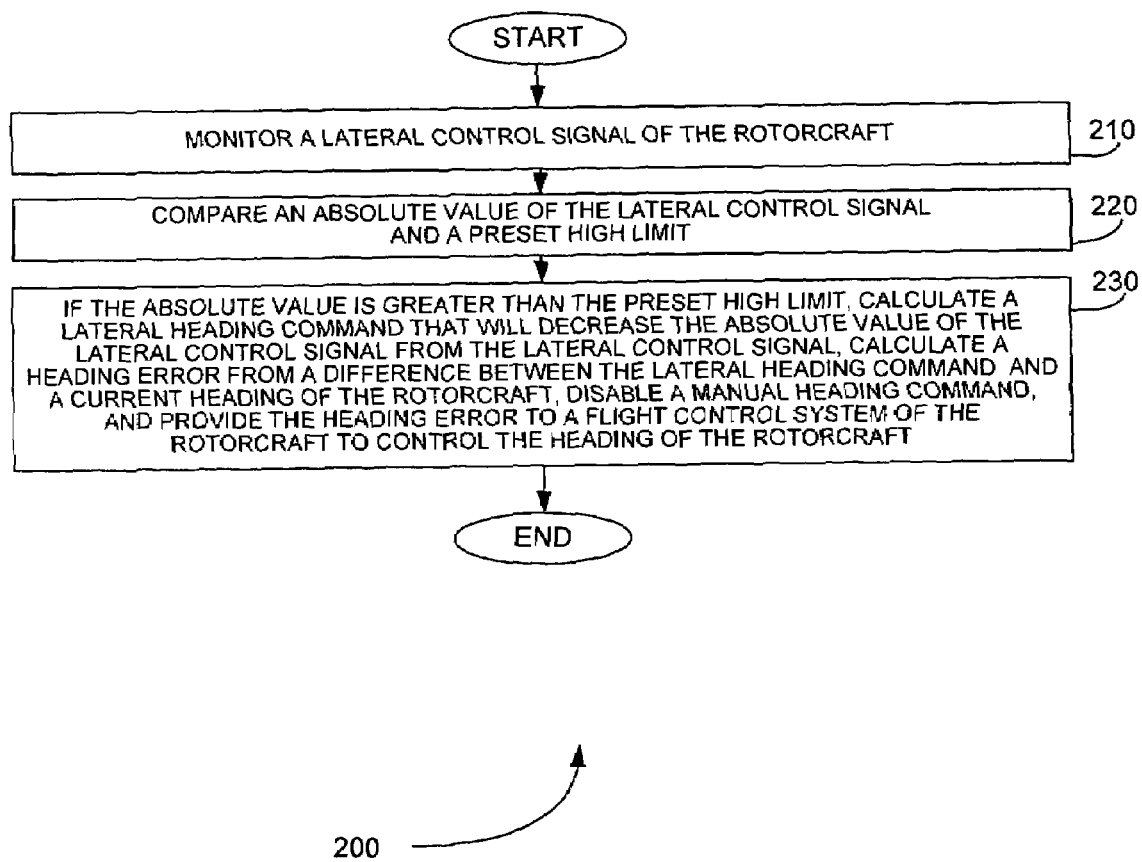
FIG. 2 is a flowchart showing a method for automatically controlling the heading of a rotorcraft, in accordance with an embodiment of the present invention.

FIG. 2 is a flowchart showing a method 200 for automatically controlling the heading of a rotorcraft, in accordance with an embodiment of the present invention. The rotorcraft can be a manned vehicle or an unmanned vehicle.

In step 210 of method 200, a lateral control signal of the rotorcraft is monitored. The lateral control signal can be, but is not limited to, a lateral swashplate position signal or a lateral acceleration signal. The lateral swashplate position signal can be, but is not limited to, an angle. The lateral acceleration signal can be, but is not limited to, an acceleration.

In step 220, an absolute value of the lateral control signal is compared to a preset high limit.

In step 230, if the absolute value of the control signal is greater than the preset high limit, a lateral heading command that will decrease the absolute value of the lateral control signal is calculated from the lateral control signal, a heading error is calculated from a difference between the lateral heading command and a current heading of the rotorcraft, a manual heading command is disabled, and the heading error is provided to a flight control system of the rotorcraft to control the heading of the rotorcraft. A lateral heading command that will decrease the absolute value of the lateral control signal is calculated from the lateral control signal by entering the lateral control signal in a lookup table and receiving the lateral heading command from the lookup table, for example.

In another embodiment of method 200, if the absolute value of the lateral control signal is less than a preset low limit, manual heading command is enabled, a manual heading error is calculated from a difference between the manual heading command and a current heading of the rotorcraft, and the manual heading error is provided to a flight control system of the rotorcraft to control the heading of the rotorcraft.

Figure 3:
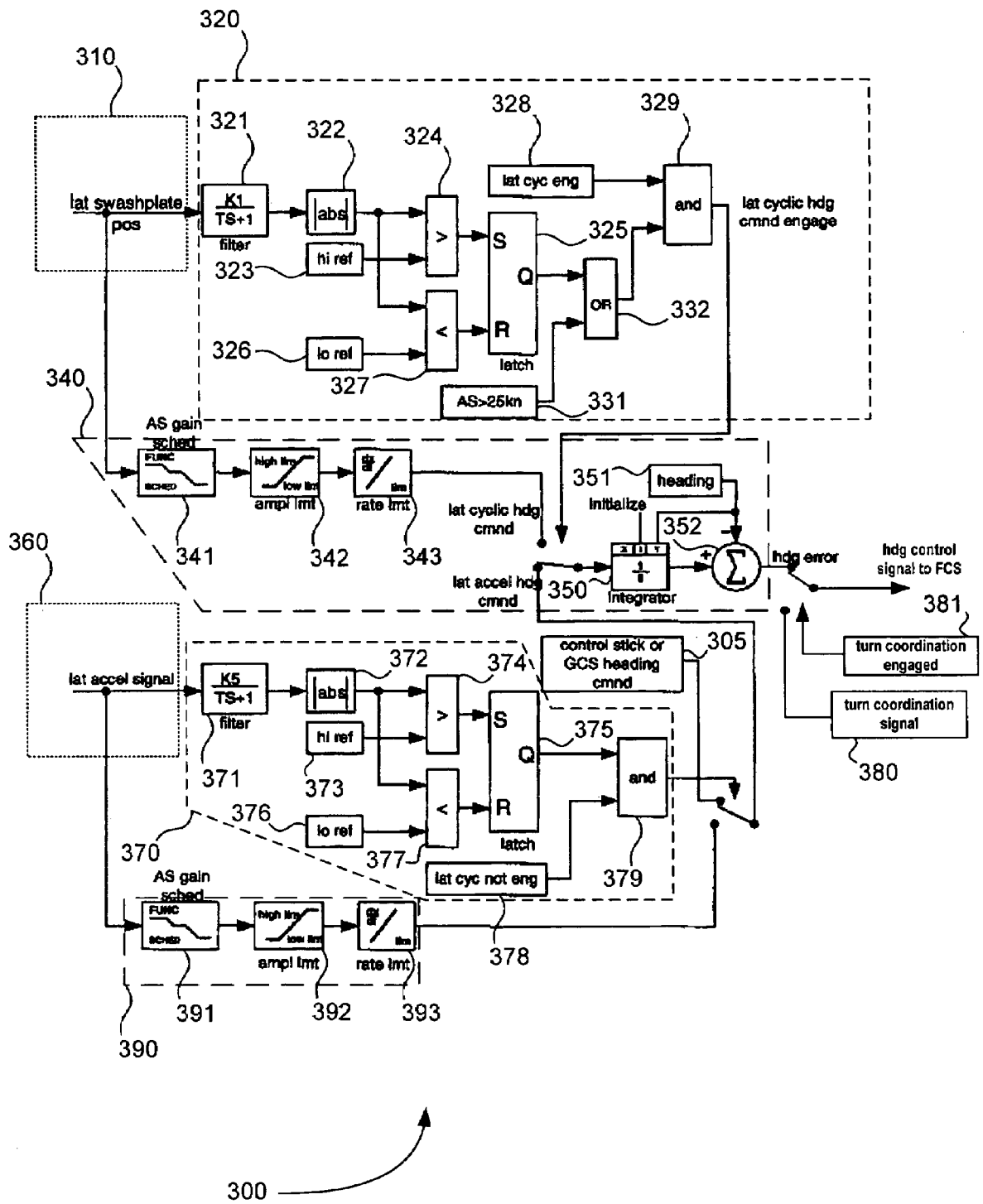
FIG. 3 is a schematic diagram of a system for automatically controlling the heading of a rotorcraft, in accordance with an embodiment of the present invention.

FIG. 3 is a schematic diagram of a system 300 for automatically controlling the heading of a rotorcraft, in accordance with an embodiment of the present invention. Although system 300 includes elements depicting hardware components, such as comparators, latches, and switches, system 300 is not limited to a hardware implementation and can be implemented in software using software components or hardware and software components.

The system 300 includes a data capture module 310, a comparison module 320, and a heading control module 340. Data capture module 310 monitors a lateral swashplate position signal of the rotorcraft.

Comparison module 320 accepts the lateral swashplate position signal as input from data capture module 310. Comparison module 320 calculates a short term average lateral swashplate position using filter 321, takes the absolute value of this average using absolute value module 322, and compares the absolute value to preset high limit 323 using comparator 324. In one embodiment, preset high limit 323 is an angle and is, for example, four degrees. If the absolute value is greater than preset high limit 323, latch 325 is set high indicating an excessive lateral force. Comparison module 320 also compares the absolute value to preset low limit 326 using comparator 327. If the absolute value is less than preset low limit 326, latch 325 is set low indicating the lateral force has been reduced to an acceptable range.

The output of latch 325 can provide selection input directly or indirectly to heading control module 340. In system 300, latch 325 indirectly provides selection input to heading control module 340 due to additional logic. This additional logic includes lateral cyclic engaged signal 328, AND gate 329, airspeed comparator 331, and OR gate 332. System 300 automatically changes the heading of a rotorcraft using the lateral swashplate position as input to the heading command if the airspeed of the rotorcraft is above a preset airspeed value. In one example, for instance, the preset airspeed value is twenty five knots. Therefore, the output of latch 325 or the output of airspeed comparator 331 is used to select the lateral swashplate position for use calculating the heading command.

System 300 can use a lateral acceleration signal in addition to the lateral swashplate position signal to detect and reduce an excessive lateral force. Lateral cyclic engaged signal 328 determines if the lateral swashplate position signal or the lateral acceleration signal is used. The output of OR gate 332 is therefore ANDed with lateral cyclic engaged signal 328 using AND gate 329 to produce a selection input signal to heading control module 340.

If system 300 uses the lateral acceleration signal to detect and reduce an excessive lateral force, data capture module 360 and comparison module 370 are used. Data capture module 360 monitors the lateral acceleration signal of the rotorcraft. Comparison module 370 accepts the lateral acceleration signal as input from data capture module 360. Comparison module 370 calculates a short term average lateral acceleration using low-pass filter 371, takes the absolute value of this average using absolute value module 372, and compares the absolute value to preset high limit 373 using comparator 374. In one embodiment, preset high limit 373 is an acceleration and is, for example, four feet per second per second. If the absolute value is greater than preset high limit 373, latch 375 is set high indicating an excessive lateral force. Comparison module 370 also compares the absolute value to preset low limit 376 using comparator 377. If the absolute value is less than preset low limit 376, latch 375 is set low indicating the lateral force has been reduced to an acceptable range.

Comparison module 370 also contains additional logic related to the signal selected by system 300. This additional logic includes lateral cyclic not engaged signal 378, AND gate 379. Lateral cyclic not engaged signal 378 determines if the lateral swashplate position signal or the lateral acceleration signal is used. The output of latch 375 is therefore ANDed with lateral cyclic not engaged signal 378 using AND gate 379 to determine whether or not select heading control module 390 should be used.

If lateral cyclic engaged signal 328 is high, and the absolute value of the lateral swashplate position is greater than or equal to preset high limit 323 or the output of airspeed comparator 331 is high, then heading control module 340 calculates a lateral cyclic heading from the lateral swashplate position from data capture module 310. The lateral swashplate position is converted to a lateral cyclic heading using airspeed gain schedule 341. Airspeed gain schedule 341 is, for example, a lookup table that converts a lateral swashplate position to a yaw heading command based on airspeed. The amplitude of the output of airspeed gain schedule 341 is limited by amplitude limiter 342, and the rate of change of the output of airspeed gain schedule 341 is limited by rate limiter 343.

The amplitude limited and rate limiter lateral cyclic heading command is sent to integrator 350. Integrator 350 converts the lateral cyclic heading command to a change in heading per unit of time. The difference of the output of integrator 350 and a current heading 351 of the rotorcraft is calculated by subtractor 352 to produce a heading error. The heading error is sent as a heading control signal of the flight control system (FCS) of the rotorcraft to adjust the heading of the rotorcraft.

Similarly, if lateral cyclic not engaged signal 378 is high, and the absolute value of the lateral acceleration is greater than or equal to preset high limit 373, then heading control module 390 calculates a lateral acceleration heading from the lateral acceleration from data capture module 360. The lateral acceleration is converted to a lateral acceleration heading using airspeed gain schedule 391. Airspeed gain schedule 391 is, for example, a lookup table that converts a lateral acceleration to a yaw heading command based on airspeed. The amplitude of the output of airspeed gain schedule 391 is limited by amplitude limiter 392, and the rate of change of the output of airspeed gain schedule 391 is limited by rate limiter 393.

The amplitude limited and rate limiter lateral acceleration heading command is sent to integrator 350. Integrator 350 converts the lateral acceleration heading command to a change in heading per unit of time. The difference of the output of integrator 350 and a current heading 351 of the rotorcraft is calculated by subtractor 352 to produce a heading error. The heading error is sent as a heading control signal to the FCS of the rotorcraft to adjust the heading of the rotorcraft. Note that integrator 350, current heading 351, and subtractor 352 are shown as part of heading control module 340, but are also used by heading control module 390.

The heading of the rotorcraft can also be controlled by turn coordination signal 380. Turn coordination signal 380 coordinates the correct yaw for a bank angle and varies based on the airspeed. Turn coordination signal 380 is used if turn coordination engaged signal 381 goes high. Turn coordination engaged signal 381 goes high when the airspeed of the rotorcraft is greater than or equal to a preset turn coordination airspeed. The preset turn coordination airspeed is forty knots, for example.

If the heading of the rotorcraft is not being automatically controlled by the lateral swashplate position signal, the lateral acceleration signal, or turn coordination signal 380, then it is controlled by a pilot or an operator. A pilot or operator of the rotorcraft can control the lateral heading using control stick or GCS heading command 305, for example. Control stick or GCS heading command 305 also reaches the FCS through integrator 350. Integrator 350 converts control stick or GCS heading command 305 to a change in heading per unit of time. The difference of the output of integrator 350 and a current heading 351 of the rotorcraft is calculated by subtractor 352 to produce a heading error. The heading error is sent as a heading control signal of the FCS of the rotorcraft to adjust the heading of the rotorcraft.

Systems and methods in accordance with an embodiment of the present invention disclosed herein can advantageously allow excessive lateral forces to be controlled on unmanned rotorcraft, where there is no pilot onboard to detect and control these lateral forces by conventional means. For manned or piloted rotorcraft, these systems and methods can be used as a backup control mechanism. Limiting the use of swashplate tilt or lateral acceleration in order not to run out of lateral or longitudinal control is known in the art as control prioritization. Systems and methods in accordance with an embodiment of the present invention allow for control prioritization.

In accordance with an embodiment of the present invention, instructions (i.e., a software program) configured to be executed by a processor to perform a method are stored on a computer-readable medium. The computer-readable medium can be a device that stores digital information. For example, a computer-readable medium includes a compact disc read-only memory (CD-ROM) as is known in the art for storing software, or any other form of data storage. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for automatically reducing the effect of a component of an external force that is laterally incident on a rotorcraft, comprising:

monitoring a signal of the rotorcraft indicative of and proportional to the component;

comparing an absolute value of the signal and a preset high limit of the signal; and if the absolute value is greater than the preset high limit, disabling manual heading control of the rotorcraft and adjusting the heading of the rotorcraft with respect to the external force so as to decrease the component.

2. The method of claim 1, wherein the external force comprises a cross wind.

3. The method of claim 1, further comprising if the absolute value is less than a preset low limit of the signal, enabling manual control of the rotorcraft.

4. The method of claim 1, wherein adjusting the heading of the rotorcraft with respect to the external force so as to decrease the component comprises calculating a heading error from a difference between the signal and a current heading of the rotorcraft and providing the heading error to a flight control system of the rotorcraft to control the heading of the rotorcraft.

5. A method for automatically reducing the effect of a component of an external force that is laterally incident on a rotorcraft, comprising:

monitoring a signal of the rotorcraft indicative of and proportional to the component;

comparing an absolute value of the signal and a preset high limit of the signal; and if the absolute value is greater than the preset high limit, disabling manual heading control of the rotorcraft and adjusting the heading of the rotorcraft with respect to the external force so as to decrease the component, wherein the signal is one of a lateral swashplate position signal and a lateral acceleration signal.

6. A method for automatically controlling the heading of a rotorcraft, comprising:

monitoring a lateral control signal of the rotorcraft;

comparing an absolute value of the lateral control signal to a preset high limit of the signal; and if the absolute value is greater than to the preset high limit:
(a) calculating a lateral heading command from the lateral control signal that will decrease the absolute value, (b) calculating a heading error from a difference between the lateral heading command and a current heading of the rotorcraft, (c) disabling a manual heading command, and (d) providing the heading error to a flight control system of the rotorcraft to control the heading of the rotorcraft.

7. The method of claim 6, wherein the lateral control signal is one of a lateral swashplate position signal and a lateral acceleration signal.

8. The method of claim 7, wherein the lateral swashplate position signal comprises an angle.

9. The method of claim 7, wherein the lateral acceleration signal comprises an acceleration.

10. The method of claim 6, further comprising:
if the absolute value is less than a preset low limit of the signal,
enabling manual heading command,
calculating a manual heading error from a difference between the manual heading command and a current heading of the rotorcraft, and
providing the manual heading error to a flight control system of the rotorcraft to control the heading of the rotorcraft.

11. The method of claim 6, wherein calculating a lateral heading command from the lateral control signal that will decrease the absolute value comprises
entering the lateral control signal in a lookup table and
receiving the lateral heading command from the lookup table.

12. The method of claim 6, wherein the rotorcraft is one of a manned vehicle and an unmanned vehicle.

13. A system for automatically controlling the heading of a rotorcraft, comprising:
a data capture module for monitoring a lateral control signal of the rotorcraft;
a comparison module that accepts the lateral control signal as input from the data capture module and compares an absolute value of the lateral control signal to a preset high limit of the signal; and
a heading control module that
accepts the lateral control signal as input from the data capture module and a result of the comparison of the absolute value of the lateral control signal to a preset high limit as input from the comparison module,
calculates a lateral heading command from the lateral control signal that will decrease the absolute value,
calculates a heading error from a difference between the lateral heading command and a current heading of the rotorcraft,
disables a manual heading command, and
provides the heading error to a flight control system of the rotorcraft to control the heading of the rotorcraft, if the result identifies the absolute value as greater than the preset high limit.

14. The system of claim 13, wherein the lateral control signal is one of a lateral swashplate position signal and a lateral acceleration signal.

15. The system of claim 14, wherein the lateral swashplate position signal comprises an angle.

16. The system of claim 14, wherein the lateral acceleration signal comprises an acceleration.

17. The system of claim 13, wherein the heading control module
enables manual heading command,
calculates a manual heading error from a difference between the manual heading command and a current heading of the rotorcraft, and
provides the manual heading error to a flight control system of the rotorcraft to control the heading of the rotorcraft, if the absolute value is less than a preset low limit of the signal.

18. The system of claim 13, wherein the heading control module calculates a lateral heading command from the lateral control signal that will decrease the absolute value by entering the lateral control signal in a lookup table and receiving the lateral heading command from the lookup table.

19. The system of claim 13, wherein the rotorcraft is one of a manned vehicle and an unmanned vehicle.

20. The system of claim 13, wherein the comparison module uses an average value of the lateral control signal over time.

21. The system of claim 13, wherein the heading control module limits the lateral heading command between a high and a low value and limits the rate of change of the lateral heading command.

* * * * *